US007856136B2

(12) United States Patent
Lee et al.

(10) Patent No.: US 7,856,136 B2
(45) Date of Patent: Dec. 21, 2010

(54) ANALYSIS OF PATTERNS AMONG OBJECTS OF A PLURALITY OF CLASSES

(75) Inventors: Shih-Jong J. Lee, Bellevue, WA (US); Samuel Alworth, Seattle, WA (US)

(73) Assignee: DRVision Technologies LLC, Bellevue, WA (US)

( * ) Notice: Subject to any disclaimer, the term of this patent is extended or adjusted under 35 U.S.C. 154(b) by 1821 days.

(21) Appl. No.: 10/828,629

(22) Filed: Apr. 14, 2004

(65) Prior Publication Data

US 2005/0232488 A1 Oct. 20, 2005

(51) Int. Cl.
G06K 9/00 (2006.01)
(52) U.S. Cl. .................. 382/133; 382/128; 382/195; 435/287.1
(58) Field of Classification Search .................. 382/128, 382/129, 133, 195–205; 435/195–205
See application file for complete search history.

(56) References Cited

U.S. PATENT DOCUMENTS

| | | | | | |
|---|---|---|---|---|---|
| 4,122,518 | A | * | 10/1978 | Castleman et al. | 382/129 |
| 5,400,249 | A | * | 3/1995 | Soll et al. | 382/219 |
| 5,719,024 | A | * | 2/1998 | Cabib et al. | 435/6 |
| 5,798,262 | A | * | 8/1998 | Garini et al. | 435/287.2 |
| 5,912,165 | A | * | 6/1999 | Cabib et al. | 435/287.2 |
| 6,512,850 | B2 | * | 1/2003 | Yaung | 382/225 |
| 7,039,621 | B2 | * | 5/2006 | Agrafiotis et al. | 706/20 |
| 7,065,510 | B2 | * | 6/2006 | Shackleford | 706/13 |
| 7,139,739 | B2 | * | 11/2006 | Agrafiotis et al. | 706/20 |
| 7,184,994 | B2 | * | 2/2007 | Bella et al. | 706/49 |

OTHER PUBLICATIONS

"A curvature based multi-resolution automatic karyotyping system" Garcia, Cristina, et al Departamento Tecnologia Electronica ETSI telecomunicacion Universidad de Malaga Published online Jun. 3, 2003.*

(Continued)

*Primary Examiner*—Bhavesh M Mehta
*Assistant Examiner*—Sean Motsinger

(57) ABSTRACT

A method for the detection and analysis of patterns receives an image containing object labels and performs relational feature development using the input image to create at least one pattern map. It then performs relational feature analysis using the at least one pattern map to create a relational feature analysis result. The pattern detection and analysis method further comprises a recipe for automation control and includes determination of a genetic anomaly.

A relational feature development method receives an image containing object labels and performs core measurement table development using the input image to create at least one core measurement table. It then performs feature table production using the at least one core measurement table to create at least one feature table. It also performs PatternMap creation using the at least one feature table to create a PatternMap. The relational feature development method further comprises a PatternMap integration and update step to create an updated PatternMap.

A boundary distance measurement receives an image containing object labels and performs structure object mask production using the input image to create structure object mask. It then performs inner distance transform using the structure object mask to create inner distance transform image and finds individual object centroid using the input image to create individual object centroid output. In addition, it finds object boundary distance using the individual object centroid and the inner distance transform image to create object boundary distance output.

13 Claims, 12 Drawing Sheets

OTHER PUBLICATIONS

Allison DC, Nestor AL. 1999. Evidence for a relatively random array of human chromosomes on the mitotic ring. J Cell Biol. 145(1):1-14.

Boyle S, Gilchrist S, Bridger JM, Mahy NL, Ellis JA, Bickmore WA. 2001. The spatial organization of human chromosomes within the nuclei of normal and emerin-mutant cells.

Bridger JM, Boyle S, Kill IR, Bickmore WA. 2000. Re-modeling of nuclear architecture in quiescent and senescent human fibroblasts. Curr Biol. 10(3):149-52.

Croft et al. 1999. Differences in the localization and morphology of chromosomes in the human nucleus. J Cell Biol. 145(6):1119-31.

Eglen SJ, et al. 2003. Dopaminergic amacrine cells in the inner nuclear layer and ganglion cell layer comprise a single functional retinal mosaic. J Comp Neurol. 446(3):343-55.

Kosak ST, et al.. 2002. Subnuclear compartmentalization of immunoglobulin loci during lymphocyte development. Science. 296(5565):158-62.

Parada LA, McQueen PG, Munson PJ, Misteli T. 2002. Conservation of relative chromosome positioning in normal and cancer cells. Curr Biol. 12(19):1692-7.

* cited by examiner

ANALYSIS OF PATTERNS AMONG OBJECTS OF A PLURALITY OF CLASSES

TECHNICAL FIELD

This invention relates to a method for the automatic or interactive analysis of patterns among objects of a plurality of classes.

BACKGROUND OF THE INVENTION

New advances in fluorescent probe technologies and imaging techniques are enabling the simultaneous imaging of many more biological entities (classes) than has been possible before. For example, spectral imaging (CRI Inc. http://www.cri-inc.com/instruments/products/index.shtml), or emission finger-printing (Carl Zeiss LSM 510 META. http://www.zeiss.de/C12567BE0045ACF1/Inhalt-Frame/C98CD5EF1EFAF4EEC1256AC5003148E9) acquire images at multiple wavelengths and can generate precise optical spectra at every pixel. In a second step, this information is used for the digital separation of up to eight fluorophores. Spectral karyotyping (SKY) (Schrock E, du Manoir S, Veldman T, Schoell B, Wienberg J, Ferguson-Smith M A, Ning Y, Ledbetter D H, Bar-Am I, Soenksen D, Garini Y, Ried T. 1996. Multicolor spectral karyotyping of human chromosomes. Science. 26; 273(5274):494-7) and multiplexed fluorescence in situ hybridization (MFISH) (Speicher M R, Gwyn Ballard S, Ward D C. 1996. Karyotyping human chromosomes by combinatorial multi-fluor FISH. Nat Genet. 12(4): 368-75.) enable the simultaneous visualization of the endogenous arrangement of the complete karyotype. These innovations increase the amount of biology we can resolve in an image by a factor of ten. Though the technologies underlying these innovations differ, the implications for biological image analysis are the same; current and next generation biological images will contain many more biological objects and relations, and many more classes of objects than has been the case until now. There will be corresponding growth in the need among scientists in basic research, drug discovery and diagnostic imaging for a versatile and flexible tool to assist users for the detection and analysis of patterns in the relational, spectral, temporal arrangement of these individual objects and object classes.

Previously limited to three (usually one channel for the nuclear background, and a channel each for two chromosome classes), cytogeneticists can now see an entire karyotype simultaneously in a single SKY or MFISH image. FIGS. 1 and 2 demonstrate this profound advance. FIG. 1 shows a typical standard FISH image of the interphase nucleus. There are three fluorescent images, FIG. 1A, FIG. 1B and FIG. 1C. Object mask images labeled by class can be produced from each channel image through image processing. See FIG. 1D, FIG. 1E and FIG. 1F. Here there are three object classes; the nuclear envelope class containing one individual object (FIG. 1A and FIG. 1D), a chromosome class containing two individual chromosomes (homologs), FIG. 1B and FIG. 1E, and a second, different chromosome class containing two individual homologs (FIG. 1C and FIG. 1F).

In contrast, FIG. 2 shows a SKY image of the metaphase rosette. SKY makes use of an interferogram to process multiple spectra at the pixel level, and algorithmically combines that information with a CCD image (FIG. 2A) to produce an output image composed of N individually segmented object masks (FIG. 2B), where N corresponds to roughly two times the number of chromosomes in the karyotype (Schrock E, du Manoir S, Veldman T, Schoell B, Wienberg J, Ferguson-Smith M A, Ning Y, Ledbetter D H, Bar-Am I, Soenksen D, Garini Y, Ried T. 1996. Multicolor spectral karyotyping of human chromosomes. Science. 26; 273(5274):494-7; Applied Spectral Imaging. http://www.spectral-imaging-.com). In FIG. 2A, N=40 for these mouse cells (humans would have 46). Each mask is labeled via a look up table with a user defined RGB value corresponding to the object (chromosome) class. In FIG. 2B there are two individual objects per object class.

Despite these advances, little software has been developed for the analysis of relational patterns among biological objects. The majority of today's analysis software is designed to measure the response of a biological system to perturbation (Giuliano K, Kapur R. 2002. System for cell based screening. U.S. Pat. No. 6,416,959; Harris T D, Hansen R L, Karsh W, Nicklaus N A, Trautman J K. 2002. Method and apparatus for screening chemical compounds. U.S. Pat. No. 6,388,788.), or to manually or automatically score disease samples (TriPath Imaging Inc., FocalPoint Slide Profiler. http://www.tripathimaging.com/usproducts/focalpoint.htm; Applied Imaging Corp., CytoVision. http://www.appliedimagingcorp.com/usa/cyto/index.htm.) by analyzing the fluorescently labeled biology in the image. In stark contrast to this type of evaluation of phenotypic characteristics of biological objects as an indicator in modern biology, software can assist human to analyze relational patterns in the location or relational, temporal arrangement of biological objects is virtually inexistence in the life sciences applications.

Due to the tedious nature of manual analysis as well as the lack of automatic analysis technology, scientists are using application-specific image analysis methods that generate only a very few patterns and few samples for analysis. The inability to rapidly create and analyze a large number of relational patterns makes it inefficient to find important characteristics. The domain of possible relational patterns and combinations of patterns is large, and even assuming that one pattern will reveal a preference of relational arrangement (which indeed may not be the case), the possibility that any one pattern will reveal that preference is low. Furthermore, current methods suffer from low repeatability because they are based on imprecise image processing techniques developed for specific applications. These methods fail in the face of typical variations found in biological images such as large variations in the shape, orientation and size of biological objects (even among the same class), image variations resulting from operator or equipment variability, and variation in image orientation.

It would be ideal for scientists to possess an efficient, robust, accurate and flexible tool for pattern creation and review. Such a tool would enable them to distinguish the difference between a pattern signal and noise, and quickly find interesting relational patterns in biological images. The pattern sets could be scientist-generated rather than computer generated, this allows the analysis outcome to be easily validated.

Scientists have long been interested in the relational arrangement of biological objects. The idea that chromosomes may be arranged in a specific fashion has been considered since the time of Boveri (Baltzer F. 1964. Theodor Boveri. Science. 15(144):809-15). A well-known demonstration of general chromosomal organization is the Rabl orientation, a polarization of centromeres and telemeres, observed in the early embryo of the fruit fly. Patterns in the relational arrangement of biological objects have been studied outside the nucleus as well in skin cancer diagnosis (BC Cancer Research Centre. Research Arm of the BC Cancer Agency. http://www.bccrc.ca/ci/ta01_archlevel.html), retinal cell arrangement (Eglen S J, Raven M A, Tamrazian E, Reese B E. 2003. Dopaminergic amacrine cells in the inner nuclear layer and ganglion cell layer comprise a single functional retinal mosaic. J Comp Neurol. 446(3):343-55.), fungal spores arrangement (Jones C L, Lonergan G T, Mainwaring D E. Minimal spanning tree analysis of fungal spore relational patterns. Published online at http://www.swin.edu.au/chem/bio/fractals/mst01.htm) and platelets in wound healing (Beals M, Gross L, Harrell S. 2000. Cell aggregation and sphere packing. The Institute for Environmental Modeling at the University of Tennessee).

Prior art detection and analysis of relational arrangement patterns is a two step process that requires image processing software, such as Universal Imaging's Metamorph (Universal Imaging Corp. Metamorph. http://www.image1.com/products/metamorph/) or Media Cybernetics' ImagePro (Media Cybernetics Inc. ImagePro. http://www.mediacy.com/famip.htm), to perform image segmentation and generate pattern measurements, and a data mining or statistics package such Spotfire's DecisionSite (Ahlberg C, Truve S, Wistrand E. 2000. System and method for automatic analysis of data bases and for user controlled dynamic querying. U.S. Pat. No. 6,014,661; Spotfire Inc. DecisionSite. http://www.spotfire.com/products/decision.asp) or Insightful's S-PLUS (Insightful S-PLUS. http://www.insightful.com/products/splus/default.asp) to evaluate the complex pattern signal. Even a single pattern signal can be complex because of the large number of object interactions. For example analyzing a nearest neighbor pattern across the objects in FIG. 2 would require the analysis of 1,560 interactions (the nearest neighbor pattern for relation i×j is not equivalent for j×i). Since there is no integrated approach, it is difficult for scientists to iterate quickly between pattern creation and pattern analysis. This approach is far from general purpose, and inefficient for finding patterns.

Some examples of this type of prior art approach:

Eglen et al. (Eglen S J, Raven M A, Tamrazian E, Reese B E. 2003. Dopaminergic amacrine cells in the inner nuclear layer and ganglion cell layer comprise a single functional retinal mosaic. J Comp Neurol. 446(3):343-55.) used Voronoi domains to analyze the relational arrangement of dopaminergic amacrine cells in two different layers of the ferret retina to determine if the arrangement was different between layers, which might indicate distinct cell function for the cells in the different layers. Eglen calculated a regularity index statistic for each cell as the Voronoi domain area divided by the standard deviation of all Voronoi domain areas in the image.

The BC Cancer Research Centre uses Minimum Spanning Tree (MST) vertex length as a feature on which statistical analysis is performed (BC Cancer Research Centre. Research Arm of the BC Cancer Agency. http://www.bccrc.ca/ci/ta01_archlevel.html). These outputs are then linearly combined into an index that can be used for the quantitative diagnosis of pre-neoplastic lesions. Jones et al. (Jones C L, Lonergan G T, Mainwaring DE. Minimal spanning tree analysis of fungal spore relational patterns. Published online at http://www.swin.edu.au/chem/bio/fractals/mst01.html) also used MST to look at fungal spore relational arrangement and its relation to the asexual reproduction mechanism. Research at the Institute of Environmental Modeling, University of Tennessee has utilized sphere packing theory to quantify the density of aggregated cells involved in wound healing (Beals M, Gross L, Harrell S. 2000. Cell aggregation and sphere packing. The Institute for Environmental Modeling at the University of Tennessee.)

Basic research in chromosome arrangement in the field of cytogenetics has been rejuvenated and accelerated with recent discoveries that link the developmental regulation of lineage-restricted genes with their nuclear compartmentalization (Brown K E, Guest S S, Smale S T, Hahm K, Merkenschlager M, Fisher A G. 1997. Association of transcriptionally silent genes with Ikaros complexes at centromeric heterochromatin. Cell. 91(6):845-54; Brown K E, Baxter J, Graf D, Merkenschlager M, Fisher AG. 1999. Dynamic repositioning of genes in the nucleus of lymphocytes preparing for cell division. Mol Cell. 3(2):207-17; Kosak S T, Skok J A, Medina K L, Riblet R, Le Beu M M, Fisher AG, Sing H. 2002. Subnuclear compartmentalization of immunoglobulin loci during lymphocyte development. Science. 296(5565): 158-62; Schubeler D, Francastel C, Cimbora D M, Reik A, Martin D I, Groudine M. 2000. Nuclear localization and histone acetylation: a pathway for chromatin opening and transcriptional activation of the human beta-globin locus. Genes Dev. 14(8):940-950.) The implication of these findings is that during cellular differentiation, the nucleus is reorganized in a way that permits the regulation of all relevant genes for a particular cell type. Similarly, there is an implication that disease progression also has an impact on nuclear organization and gene regulation. As a result, leading cytogenetics researchers are attempting to find and understand patterns in chromosome relational arrangements in an ad hoc fashion, developing their own features for use with standard FISH images (Croft J A, Bridger J M, Boyle S, Perry P, Teague P, Bickmore W A. 1999. Differences in the localization and morphology of chromosomes in the human nucleus. J. Cell Biol. 145(6):1119-31.; Boyle S, Gilchrist S, Bridger J M, Mahy N L, Ellis J A, Bickmore W A. 2001. The relational organization of human chromosomes within the nuclei of normal and emerin-mutant cells; Bridger J M, Boyle S, Kill I R, Bickmore W A. 2000. Re-modeling of nuclear architecture in quiescent and senescent human fibroblasts. Curr Biol. 10(3): 149-52.; Nagele R, Freeman T, McMorrow L, Lee H V. 1995. Precise relational positioning of chromosomes during prometaphase: evidence for chromosomal order. Science. 270(5243):1831-5.; Allison D C, Nestor A L. 1999. Evidence for a relatively random array of human chromosomes on the mitotic ring. J. Cell Biol. 145(1):1-14.). For example, Misteli has used nearest neighbor (Parada L A, McQueen P G, Munson P J, Misteli T. 2002. Conservation of relative chromosome positioning in normal and cancer cells. Curr Biol. 12(19):1692-7.), Allison has used radial angle between chromosomes (Allison D C, Nestor A L. 1999. Evidence for a relatively random array of human chromosomes on the mitotic ring. J. Cell Biol. 145(1): 1-14) and Bickmore (Croft J A, Bridger J M, Boyle S, Perry P, Teague P, Bickmore W A. 1999. Differences in the localization and morphology of chromosomes in the human nucleus. J. Cell Biol. 145(6): 1119-31) has used distance from the boundary of the nucleus.

These examples demonstrate that scientists are using application specific image analysis approaches that generate only a few patterns (e.g. Voronoi based regularity index, MST vertex length, nearest neighbor etc.) for analysis. But unfortunately, reliance on a single pattern or small pattern set reduces the chance that important patterns will be detected.

Biological samples such as SKY images of the metaphase rosette (FIG. 2A) are non-standard, and often are distorted and arbitrarily oriented. It is difficult to process a large number of SKY images in a robust and accurate fashion that allows result accumulation, which is critical for population analysis to confirm hypotheses or discover subtle pattern differences. The prior art image processing software is unable to handle these large variations. It is impractical to manually normalize the samples. It is highly desirable to have an image analysis tool to automatically normalize the distortion and inter-sample variations among input images for robust and accurate, automated measurements across multiple samples.

A key limitation of current approaches to relational pattern detection is the lack of comprehensive relational pattern configuration features for use in pattern detection. This is due to the tedious nature of manual analysis as well as a lack of image analysis technology. This limitation prevents the detection of subtle differences or higher order (non-trivial) relations within a class or between classes. By using more relational pattern features, users will be more likely to tell the difference between a pattern's signal and noise and could find meaningful patterns efficiently. Also, leading laboratories have indicated that pattern features must be easily understandable so that outcomes can be validated.

Scientists need an integrated image processing and data analysis tool that can enable the creation of many user defined relational pattern features, and support interactive feature mining for pattern detection and analysis; all in a package that is easy to use and requires no programming. No such tool or combination of tools currently exists.

OBJECTS AND ADVANTAGES

In a preferred embodiment, the invention includes an advanced analysis tool called a PatternMap that can be used to detect and analyze strong intrinsic relational patterns within an experimental condition, as well as discriminating relational patterns that can differentiate experimental conditions. The tool is easy to use and understand, and is general purpose for use with any biological image application. Requiring only rudimentary programming, it enables users to efficiently create their own relational patterns with which to rapidly evaluate the relational arrangement of object classes. It provides an efficient interface for users to rapidly try out different patterns for enhanced understanding and hypothesis validation, and it supports the comparison of patterns across experimental conditions.

The primary objective of this invention is to provide a general purpose tool that can be used for the detection and analysis of relational patterns in the relational arrangement of individual objects belonging to large numbers of object classes in biological images. Another objective is to normalize the distortion and inter-sample variations among input images for robust and accurate, automated core measurements across multiple samples. A third objective is to allow users to develop their own human comprehendible relational pattern features and combined pattern features with which to detect patterns through an innovative recipe creation interface that requires no programming. The fourth objective is to provide an innovative pattern detection and analysis framework, called a PatternMap, that enables the detection and validation of intrinsic patterns within an experimental condition. The fifth object is to enable the comparison of PatternMaps that illuminates critical differences in patterns between experimental conditions using PatternMap operations. The sixth objective is to enable genetic diagnosis using PatternMap or PatternMap derived features.

SUMMARY OF THE INVENTION

A method for the detection and analysis of patterns receives an image containing object labels and performs relational feature development using the input image to create at least one pattern map. It then performs relational feature analysis using the at least one pattern map to create a relational feature analysis result. The pattern detection and analysis method further comprises a recipe for automation control and includes determination of a genetic anomaly.

A relational feature development method receives an image containing object labels and performs core measurement table development using the input image to create at least one core measurement table. It then performs feature table production using the at least one core measurement table to create at least one feature table. It also performs PatternMap creation using the at least one feature table to create a PatternMap. The relational feature development method further comprises a PatternMap integration and update step to create an updated PatternMap.

A boundary distance measurement receives an image containing object labels and performs structure object mask production using the input image to create structure object mask. It then performs inner distance transform using the structure object mask to create inner distance transform image and finds individual object centroid using the input image to create individual object centroid output. In addition, it finds object boundary distance using the individual object centroid and the inner distance transform image to create object boundary distance output.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Overview

Figure 3:
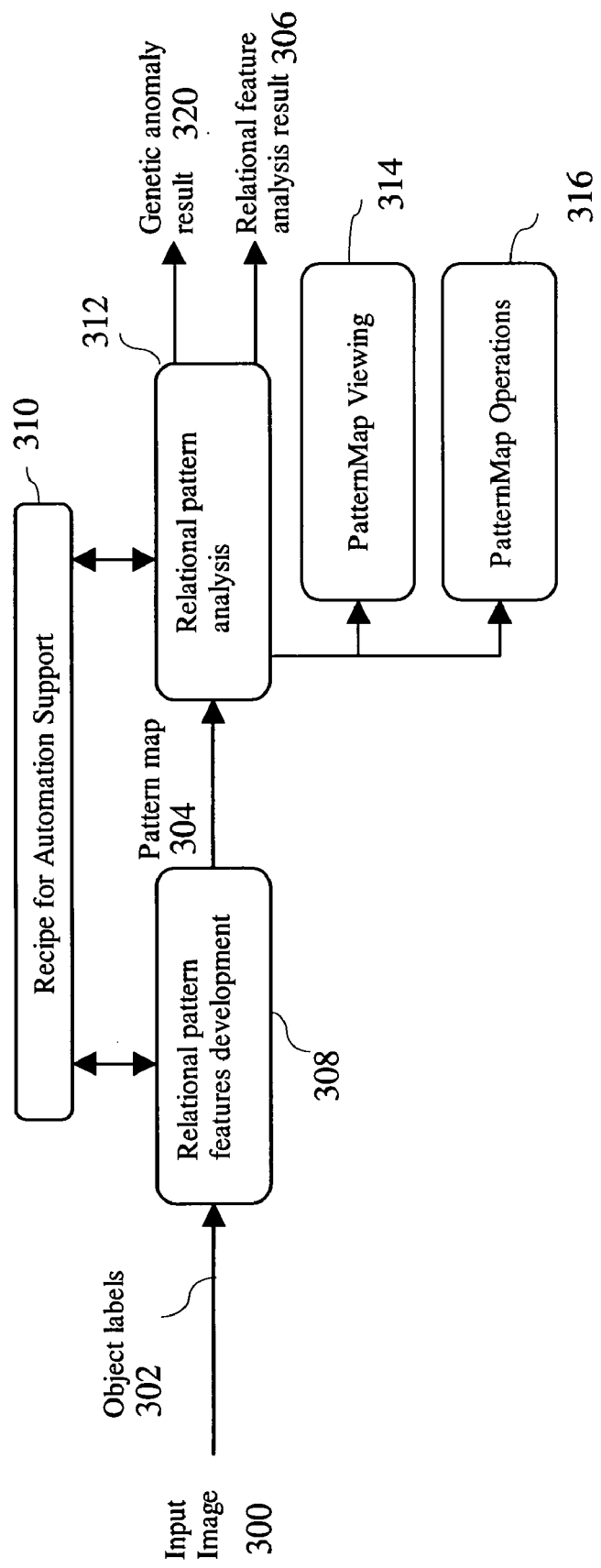
FIG. 3 shows the processing flow for the PatternMap system.

In one embodiment, the PatternMap of this invention is a general purpose method for the detection and analysis of automatically generated or user defined patterns in images containing large numbers of object classes with variable number of objects belonging to each class. Given input image(s) containing object labels such as N number of segmented objects belonging to C number of object classes, the PatternMap system is composed of two steps as shown in FIG. 3; relational features development 308, and relational pattern analysis 312. The relational feature development method uses the object labels 302 containing in the input image 300 to create at least one pattern map output 304. The relational pattern analysis step 312 uses the at least one pattern map 304 to create a relational pattern analysis result output 306. In addition, the relational pattern analysis step 312 could also determine genetic anomaly result 320. The relational pattern analysis 312 is composed of PatternMap viewing 314 and PatternMap operations 316. The PatternMap development interfaces can be used to create user-defined or automatically generated recipes to support automation 310.

Figure 4:
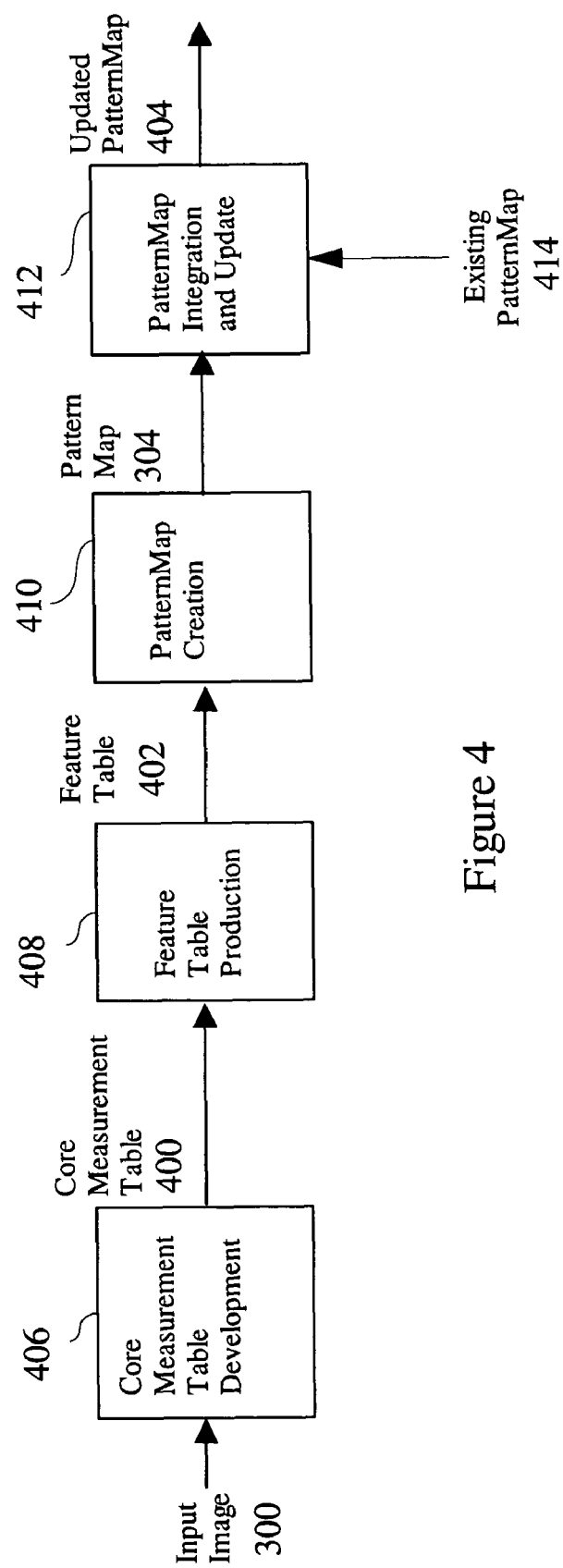
FIG. 4 shows the processing flow for the relational features development method.

As shown in FIG. 4, the relational features development method is composed of core measurement table development 406, feature table production 408, PatternMap creation 410 and PatternMap integration and update 412. The core measurement table development step 406 uses the input image 300 to create at least one core measurement table output 400. The feature table production step 408 uses the at least one core measurement table 400 to create at least one feature table output 402. The PatternMap creation step 410 uses the at least one feature table 402 to create a PatternMap output 304. The PatternMap integration and update step 412 integrates a PatternMap 304 into an existing PatternMap 414 through an update process to create an updated PatternMap 404.

Relational Pattern Features Development

In one embodiment, the invention consists of a set of core image measurements that can be manipulated by the user or by computer program to generate a nearly unlimited number of features to describe the relational arrangements of objects in a biological image. These measurements are generated automatically using image processing technologies disclosed by Lee, S. J. J. and Oh, S., entitled "Intelligent Relational Reasoning" U.S. patent application Ser. No. 10/411,437 filed Apr. 9, 2003, and a second patent application by Lee, S. J. J. and Phan, T. entitled "Method for adaptive image region partition and morphological processing", U.S. patent application Ser. No. 10/767,530 filed Jan. 26, 2004, which are incorporated in their entirety herein. The PatternMap recipe creation interface allows computer automatic generation of features or manual feature development by users or both to develop features and feature combinations with which to detect patterns from these core measurements requiring little or no programming.

Relational Pattern Analysis

Once the user directed or automatic relational pattern feature or features combination has been merged into a user defined pattern, the system can automate the production of a PatternMap that enables the detection and validation of intrinsic patterns within a cell type. The PatternMap consists of a novel data structure, processing operations and an easy user interface designed for the purpose of visualizing C×C object class relationships across an image set. Each row of the PatternMap is essentially a distribution of object classes relations to the C other classes (including itself). In an embodiment, the PatternMap include many visualization tools and multi-level object linking that can support PatternMap interactive result visualization, processing modification, and outcome validation.

Typically an image set corresponds to an experimental condition. With the PatternMap it is possible to create multiple PatternMaps, each one for a given experimental condition (e.g. disease, test, control, etc). PatternMap operations enable the comparison of PatternMaps representing different object classes. Differences between PatternMaps can be easily detected through inter-map arithmetic and logical operations, as well as with automatic inter-map statistics that highlight differences.

II. Inputs

Inputs to the PatternMap system are mask image(s) of N number of segmented objects belonging to C number of object classes. Object segmentation can be performed using standard image segmentation and classification tools on biological images. Objects could be segmented from standard fluorescence microscopy images and FISH images, as well as next generation spectral imaging, emission fingerprinting, spectral karyotyping or MFISH images. Those skilled in the art will recognize that the invention can just as easily be extended to address diagnostic images such as digital X-ray, ultrasound, computed tomography, magnetic resonance imaging, positron emission tomography and of course standard CCD images produced from surgical procedures involving endoscopes. Also, the pattern could be derived from not only relational relations but also spectral, temporal, or other relations.

III. Relational Pattern Features Development

III.1 Core Measurement Table Production

In one embodiment of the invention, a set of core measurements from which the user or a computer can assemble nearly any combination of relational patterns for analysis is in the PatternMap. The core measurement (CM) table stores the core measurement data through automatic or semi-automatic processing on the mask images. These tables are all that is needed for follow on analysis so that the raw images do not have to be reprocessed. In the manual mode, a user interacts with the core measurement tables through a graphical user interface (GUI) to create relational pattern features of their choice.

In one embodiment of the invention, core measurement tables include conditional tables and relational tables. Conditional tables are one-dimensional tables (0-N) or other similar sizes that store a core measurement for an individual object. In one embodiment of implementation, N is defined as $$N = \sum_{0}^{C} \sum_{0}^{B} 1$$

where C is the number of object classes and B is the (variable) number of objects for a given class. They are called conditional tables because they are used to condition the relational tables by filtering out entries that don't meet a defined condition based on the measurement in the conditional table. In one embodiment of the invention, the measurements include but are not limited to:

Boundary distance: shortest distance (in pixels) from each object to a structural boundary. The boundary could be one of the object masks, such as the nuclear mask, or rosette mask shown in FIG. 5A. The boundary could also be the image frame.

Radial distance: the radial distance is the angular distance (in radians) of an individual object's centroid vector from the horizontal axis, defined relative to the boundary determined by the user.

Relational tables are N×N tables or other similar sizes where each element of the table encodes a core measurement describing a relation between two objects. In one embodiment of the invention, the measurements include but are not limited to:

Object distance: the lowest number of individual objects between two individual objects; the unit is in number of objects (the distance between adjacent objects is zero)

Radial difference: the difference in radians between two objects.

▫ boundary difference: the normalized absolute difference in the boundary distance of two objects.

Pixel distance: the shortest distance between two objects.

III.1.1 Boundary Distance Table Production

The boundary distance table is a one-dimensional table where the shortest distance from each individual object centroid to the structure boundary is stored. The boundary distance measurement performs structure object mask production using the input image to create a structure object mask. It then performs an inner distance transform using the structure object mask to create an inner distance transform image. It also finds individual object centroids using the input image to create individual object centroids. It then finds object boundary distance using the individual object centroid and the inner distance transform image to create the object boundary distance output.

III.1.1.1 Structure Object Mask Production

Figure 5B:
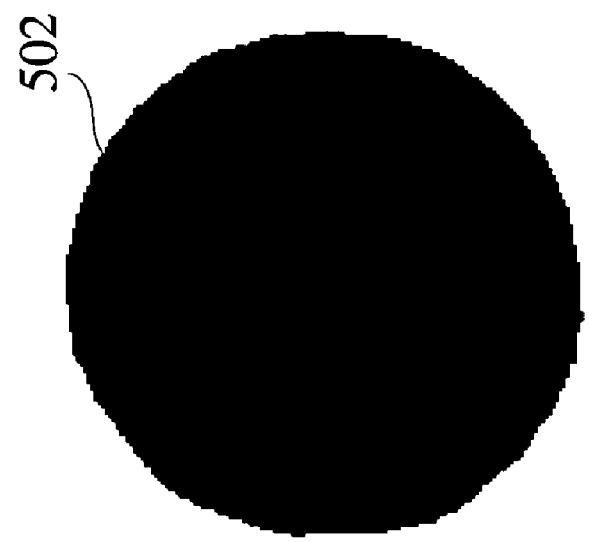
FIG. 5B shows a nucleus mask from a standard FISH image. It can be used as a reference structure with which to calculate core measurements.

The first step creates the structure object mask. As mentioned above, the structured object could be created from one of the object classes, such as the nuclear envelope 502 in FIG. 5B, or from some structure in the image, such as the chromosome rosette 500 shown in FIG. 5A, or the image boundary. In some cases, like the nuclear mask for instance, no processing is needed, but in others some image processing is required to create the structure object mask, as shown in FIG. 6 where a morphological closing operation is performed to create a rosette structure object mask 500 from an image containing individual chromosome masks 600.

III.1.1.2 Inner Distance Transform (IDT) Image

Inner distance transformation creates a distance image that assigns the shortest distance from each of the mask object pixels to a background pixel (Meijster A, Roerdink B T M, Hesselink W H. 2000. A general algorithm for computing distance transforms in linear time; Kolountzakis M N, Kutulakos K N. 1992. Fast computation of the Euclidean distance map for binary images. Information Processing Letters). Using the structure object mask image, an inner distance operation is performed on the object mask. The inner distance transform creates a transformed image where for every pixel inside the reference structure, the shortest integer pixel distance from that location to the structure object boundary is encoded as that pixel's value. Thus, pixels outside or on the structure boundary are assigned a zero, pixels one pixel inside the structure boundary are assigned a one, pixels two pixels inside the structure boundary are assigned a two and so forth such that the highest number will be encoded in pixels that are located the farthest distance from the structure boundary. Those skilled in the art should recognize that different distance metric could be used. Euclidian distance (norm 2) is used in FIG. 7.

Figure 5A:
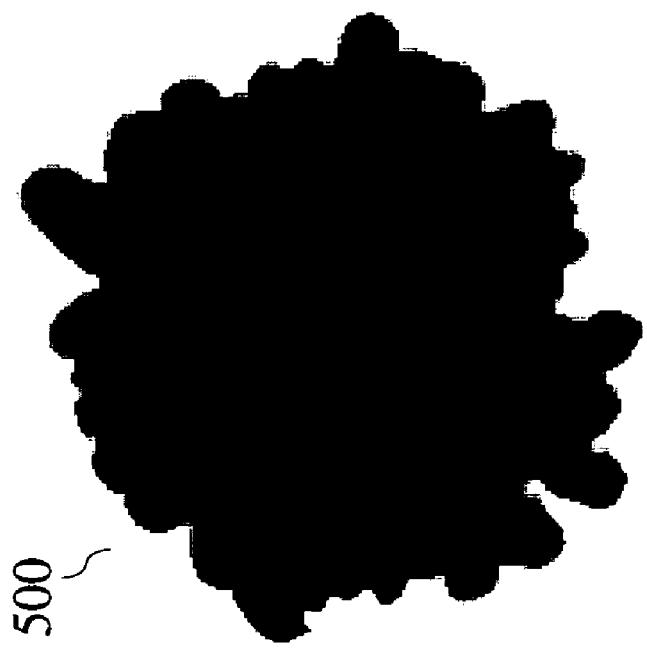
FIG. 5A shows a rosette mask from a SKY image. It can be used as a reference structure with which to calculate core measurements.
Figure 6:
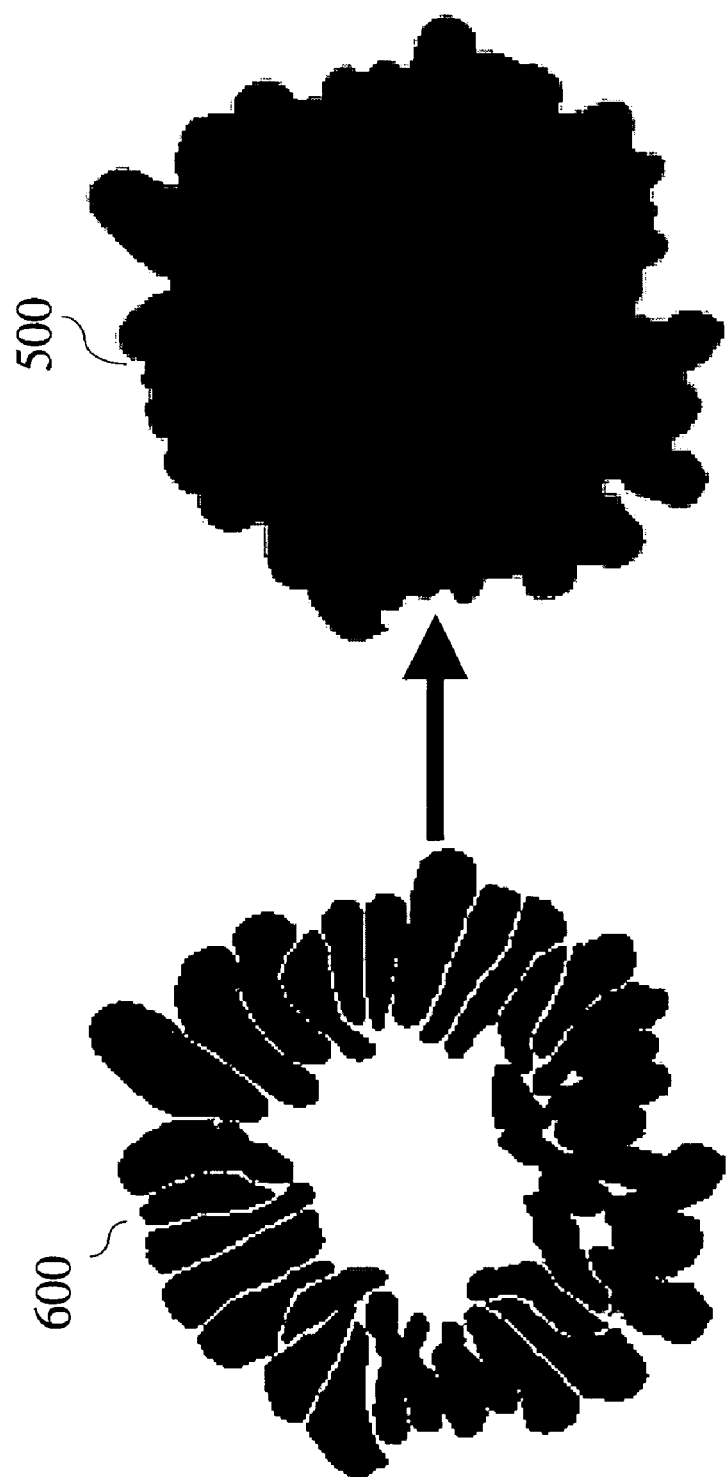
FIG. 6 shows a rosette structure object can be produced from an image of individual object masks through a morphological closing operation.
Figure 7B:
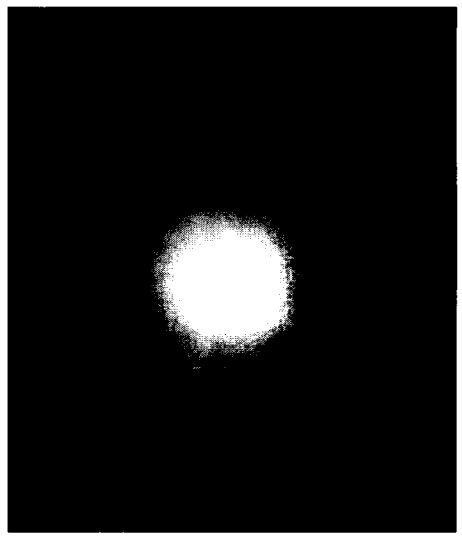
FIG. 7B shows an inner distance transform images produced by performing an IDT operation on the nucleus mask image of FIG. 5B.
Figure 7A:
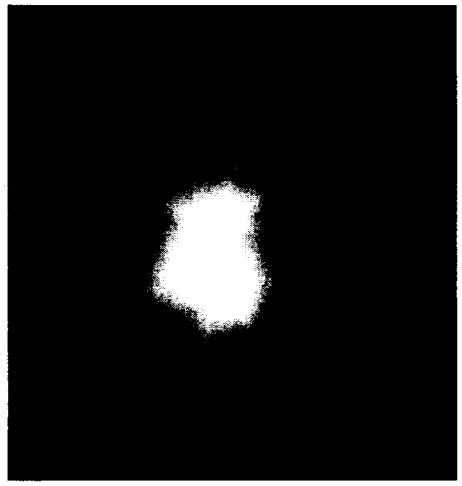
FIG. 7A shows an inner distance transform images produced by performing an IDT operation on the rosette mask image of FIG. 5A.
Figure 7C:
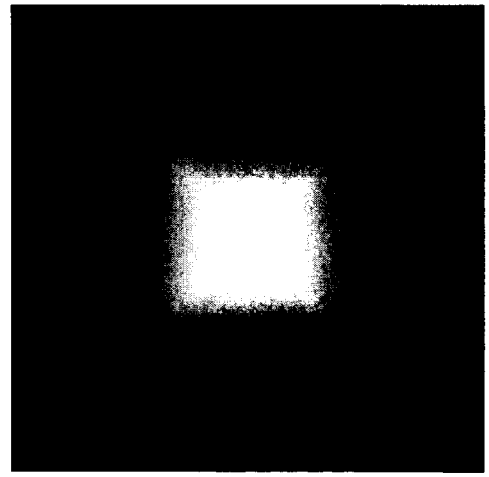
FIG. 7C shows an inner distance transform images produced by performing an IDT operation on the entire image.

FIG. 7A shows an IDT image for the rosette structure shown in FIG. 5A. FIG. 7B shows an IDT image for the nucleus mask image shown in FIG. 5B. FIG. 7C shows an inner distance transform images produced by performing an IDT operation on the entire image. This is applicable in the case where the image frame is the reference structure.

III.1.1.3 Find Individual Object Centroid

Given an image composed of individual object masks, each object's centroid can be computed from the $1^{st}$ moment of each component. For a given mask R, the centroid of R $(x_0, y_0)$ can be found as:

$$x_0 = \frac{\sum_{(x_i,y_i) \in R} x_i}{\sum_{(x_i,y_i) \in R} 1}, \quad y_0 = \frac{\sum_{(x_i,y_i) \in R} y_i}{\sum_{(x_i,y_i) \in R} 1}$$

III.1.1.4 Find Object Boundary Distance

Figure 8:
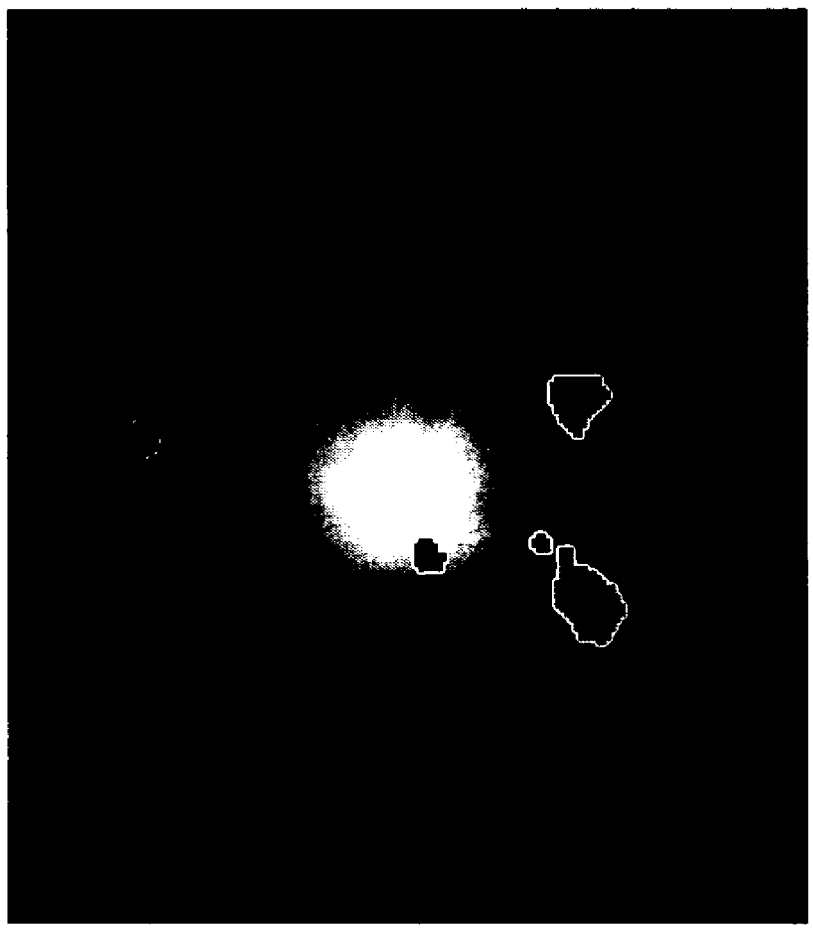
FIG. 8 shows individual object masks overlain on the structure mask IDT image of FIG. 7B.

For each individual object i in the boundary distance table, the boundary distance of i is the value in the pixel location in the IDT image that corresponds to chromosome i's centroid location in the mask image. FIG. 8 shows the masks of the individual chromosomes from FIG. 1 overlain on the nuclear structure mask IDT image. Each individual chromosome boundary distance can be found by the pixel value in the IDT image at the location corresponding to the chromosome mask centroid. Note that if an object is outside the reference structure object, its boundary distance will naturally be assigned to zero. Those skilled in the art should recognize that other methods for finding object boundary distance could be used. For example, object boundary distance could be defined as the maximum IDT value within the object mask.

III.1.2 Radial Distance Table Production

The radial distance table is the angular distance (in radians) of each individual mask object's centroid vector from the horizontal axis.

In one embodiment of the invention, the center of the axis is set at the centroid of the structure object mask as described above in III.1.1.1. A meaningful reference object should be chosen, as it provides a reference or coordinate system within which the individual object's relative positions are stored in the radial distance (and boundary distance) tables. Examples of meaningful structures include the chromosome rosette, nuclear envelope, tissue structure such as a colon crypt (Cooper H S, Murthy S N S, Shah R S, Sedergran D J. 1993. Clinicopathologic Study of Dextran Sulfate Sodium Experimental Murine Colitis. Lab Invest. 69(2):238-49) or if there is no appropriate reference structure in the field of view, the image frame can be chosen. Calculate the centroid for the structure object mask from the $1^{th}$ moment of the mask, the same as is done above for the individual objects in III.1.1.3.

Set the zero radians horizontal axis (relative to image frame) from the centroid of the structure mask to the edge of the image. For each individual object 0-N, we measure the radial displacement of its centroid from 0 and put that value (0–$2\pi$ radians) into the Radial Distance table.

III.1.3 Object Distance Table Production

The object distance table is an N×N relational table where each table element i×j stores the object distance between individual objects i and j.

Object distance is the fewest number of individual objects between 2 individual objects i and j; the distance unit is in object count. For example, given four individual objects in a line A, B, C, D, E:

The object distance of (A,B): OD(A,B)=0
OD(A,C)=1 since there is B between them
OD(A,D)=2 since there are B and C between them
OD(A,E)=3 since there are B, C and D between them

III.1.3.1 Adaptive Zone of Influence (AZOI)

AZOI is a zone of influence (ZOI) operation where a component characteristic dependent distance metric is applied. ZOI operation assigns each pixel of the image a unique label of the connected component to which it is closest (influenced). ZOI labeling performs fast region partitioning (Ogniewicz R L, Ilg M. 1992. Voronoi skeletons: theory and applications. IEEE Comp. Vision and Pattern Rec. 63-69; Ogniewicz R L, Kubler O. 1995. Hierarchic Voronoi skeletons. Pattern Recognition nr. 28; 343-359).

To produce the object distance table, first we perform an AZOI to find AZOI boundaries having outer distance values less than or equal to a given threshold to find the meaningful transitions between adjacent objects.

AZOI provides a method for adaptive image region partition and morphologic processing. The partition could be computed sequentially by a two-pass procedure similar to distance transformation. In addition to the shortest distance, the method tracks, propagates, and updates the component label where a pixel's shortest distance is derived.

The AZOI partition is done for each individual object mask in the input mask image(s). The purpose of the AZOI is to create a non-ambiguous representation across which adjacency transitions can be calculated. In many biological imaging applications, it is desirable for adjacency to be calculated for two objects even if they are not touching. On the other hand, it is often undesirable for two objects to be calculated as adjacent if they are separated by a large expanse of empty space. To address this issue, this embodiment utilizes component outer distance transformation based threshold as a distance metric to constrain the ZOI region partition.

Figure 9:
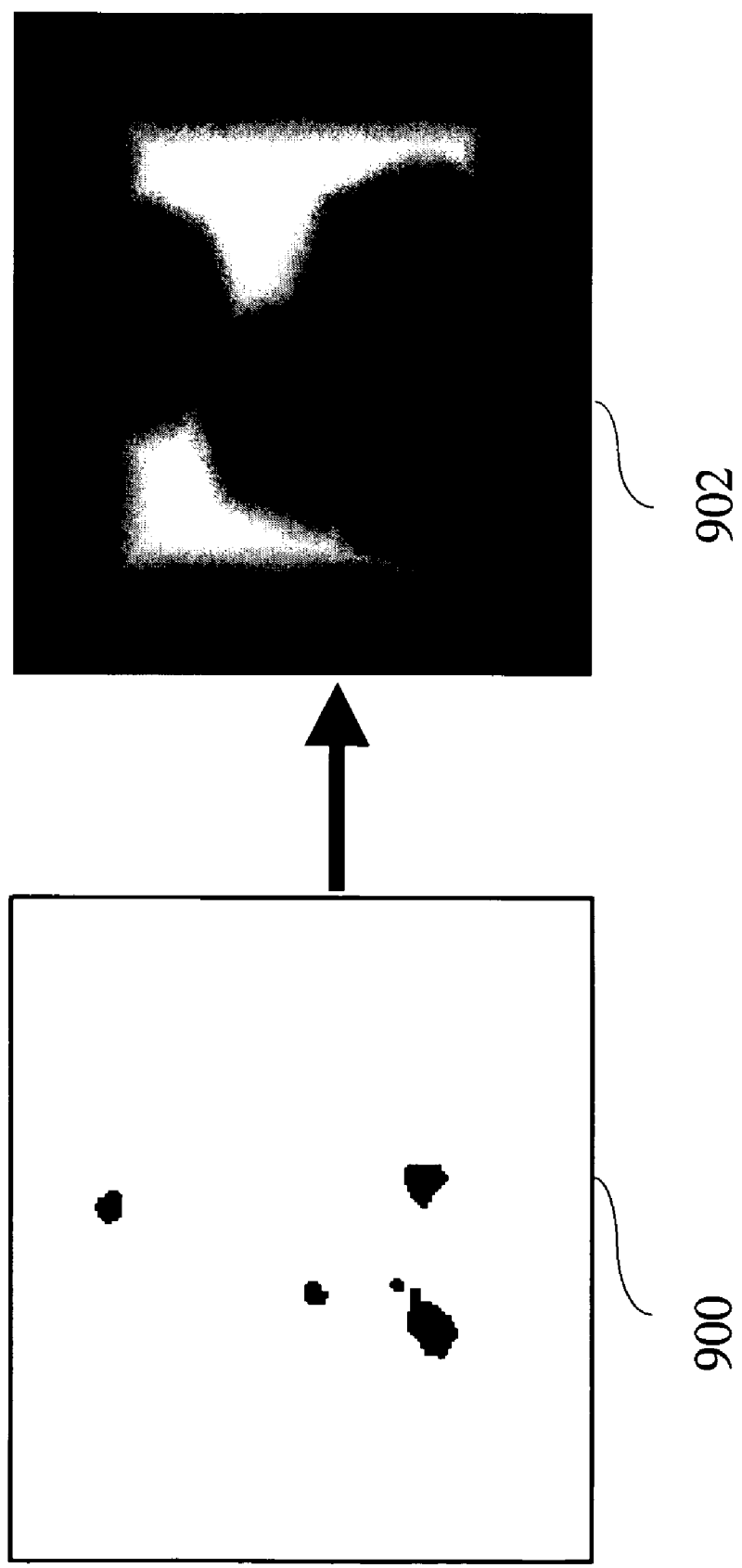
FIG. 9 shows an ODT operation is performed on the chromosome mask generated from the union of FIG. 1E and FIG. 1F.

An ODT image is the opposite of the IDT image described above. As shown in FIG. 9, given an input image composed of individual mask objects 900, for each pixel located outside the mask objects, the ODT encodes the shortest distance from that pixel to an object mask boundary as that pixel's value 902.

Figure 10A:
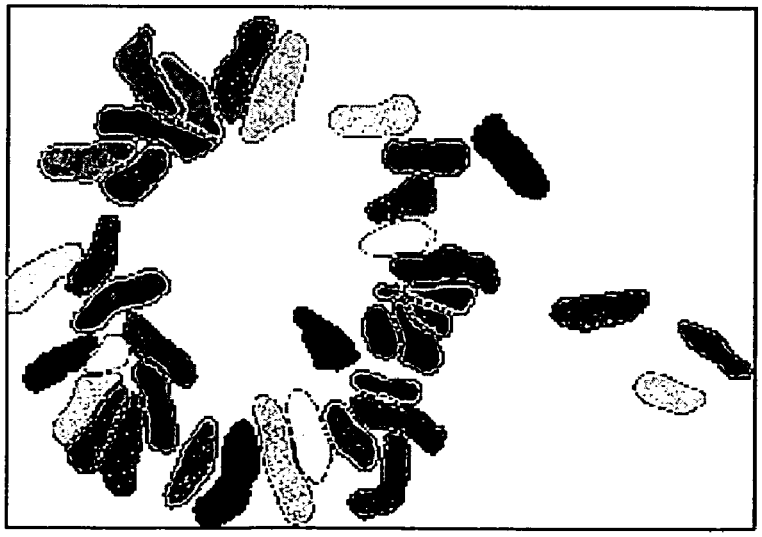
FIG. 10A shows an input object mask image.
Figure 10B:
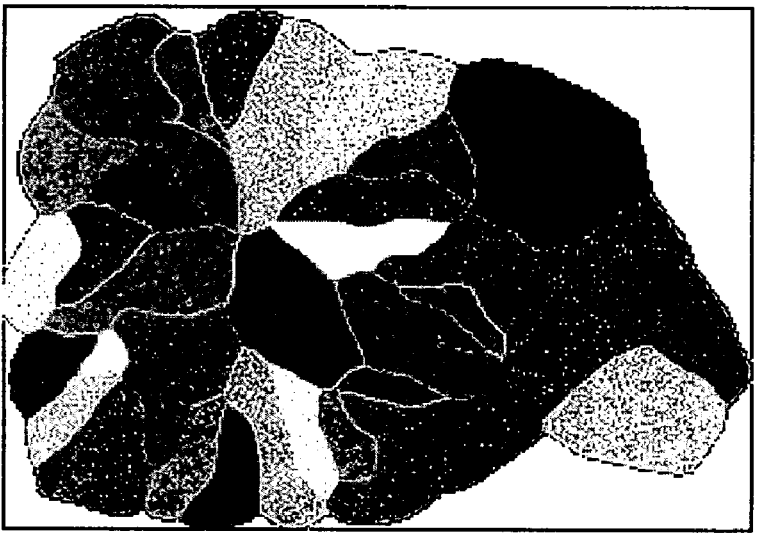
FIG. 10B shows the unweighted ZOI partition of FIG. 10A.
Figure 10C:
FIG. 10C shows an ODT weighted ZOI partition of FIG. 10A.

The ODT image can be used to threshold the ZOI partition by removing ZOI boundaries with large ODT values. This enables transition identification that ignores adjacency across large, empty areas. This ODT based threshold can be set by the user or determined automatically. FIG. 10A shows an input mask object image from a SKY platform. The non-weighted ZOI image for the individual objects in FIG. 10A is shown in FIG. 10B, and the ODT weighted ZOI image is shown in FIG. 10C. For this embodiment, determine the adjacent pairs from the object labels corresponding to each of the retained ZOI boundaries.

III.1.3.2 Populate the Object Distance Table

First we populate an intermediate, object adjacency table by placing each individual's adjacent neighbors (look up from the adjacent pairs) into it's adjacency set (each member $Adj_{ij}$ is adjacent to object i as follows:

i=1|$Adj_{11}$, $Adj_{12}$, $Adj_{13}$ ... $Adj_{1k}$
2=|$Adj_{21}$, $Adj_{22}$, $Adj_{23}$ ... $Adj_{2l}$
...
N □$Adj_{N1}$, $Adj_{N2}$, $Adj_{N3}$ ... $Adj_{Nm}$

Next we use this adjacency set information to populate the Object Distance Table, which is a relational N by N table containing the object distance of each object interaction i×j.

Conceptually, the algorithm for determining object distance is:
(1) For a given chromosome i find all its adjacent neighbors
    (a) Label the distance from i to these neighbors as 0
(2) Group i and its neighbors into group A
(3) Find all of group A's adjacent neighbors
    (a) Label the distance from i to these neighbors as 1
(4) Repeat and increment distance until there are no more objects In pseudo code:

```
ADJ(C_i) ∀ i ∈ {1 .... N}
For (i = 1; i ++; i ≦ N)
{
    A =Ø; B = ADJ(C_i); d = 0;
    while (B ≠ Ø)
    {
        for (j = 0; j ++; j ≦ N)
        {
            if(c_j ∈ B && j ≠ i)
            dist (ci,cj) = d; // dist( ) loads the object distance table
        }
        d++;
        A = A ∪ B;
        B = ∪_{Ck∈A} ADJ(C_k) – A;
    }
}
```

III.1.1.4 Radial Difference Table Production

The radial difference table is an N×N relational CM table that for any given individual object interaction i×j the radial difference between object i and j will be recorded.
a) Radial difference is measured in radians
b) Radial difference is the smallest angle between i and j (0–$\pi$)
c) Radial difference can be calculated from the conditional radial distance table

III.1.5 ΔBoundary Distance Table Production

Δ boundary distance is an N×N table where for a given object relation i×j, Δ boundary distance is the normalized absolute difference in the boundary distances of each object. It indicates the "In/Out-ness" of the i, j relation. A high score means that one of the pair is near the center and the other is near the boundary. A low score means that both are close together relative to the center or the boundary.

Δ Boundary Distance can be derived from the conditional boundary distance table (BD). For a given interaction i×j, Δ Boundary distance is the absolute difference between i and j's boundary distance, divided by the maximum boundary distance in the reference structure object mask.

$$\Delta \text{ Boundary Distance} = \frac{|BD[i] - BD[j]|}{\max_k(BD[k])}$$

where BD[i] is the boundary distance value for object i and k is the max entry in the BD array.

III.1.6 Pixel Distance

In one embodiment of the invention, there are two kinds of pixel distance tables; pixel distance average and pixel distance edge. Those skilled in the art should recognize that other methods of pixel distance such as median, minimum, or other statistics could be used. They are all within the scope of this invention.

III.1.6.1 Pixel Distance Average Table: Distance_avg

The pixel distance_avg table is a N×N table that for any given individual object interaction i×j records the average of the shortest distance of each pixel in i to the boundary of j.

Figure 11B:
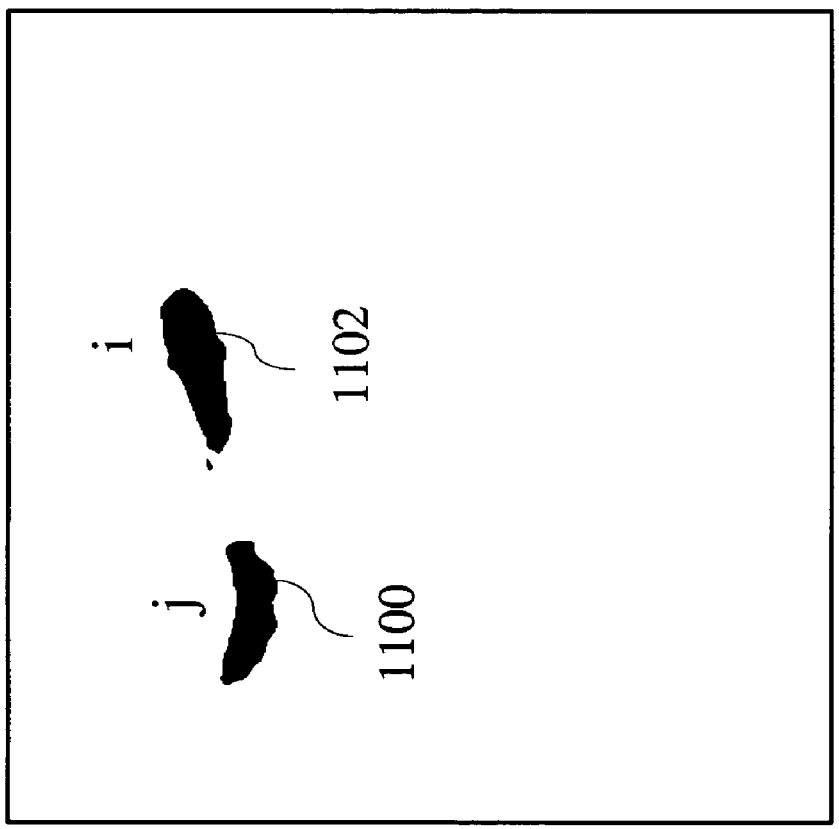
FIG. 11B shows overlay of the mask of object i onto object j's ODT image.
Figure 11A:
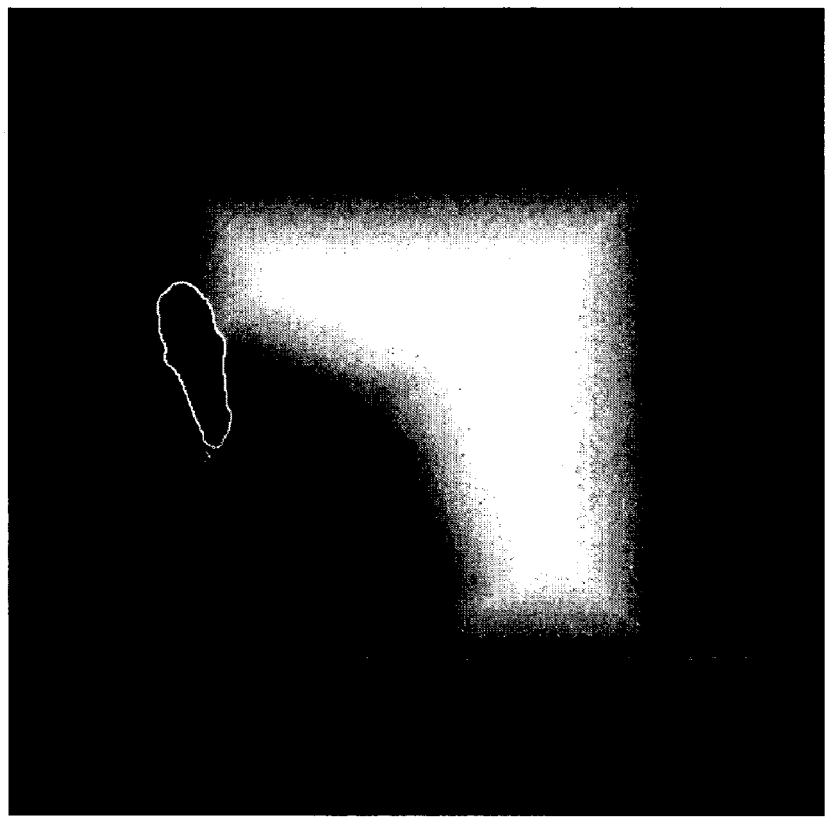
FIG. 11A shows the masks of two objects i and j.

Given an object j 1100, we create the ODT image (FIG. 11B) from the boundary of j 1100 as described above in III.1.3.1. We then overlay the mask of object i 1100 onto this ODT image (FIG. 11B), and take the average ODT value of the pixels within i from the ODT image as shown in FIG. 11A and FIG. 11B.

$$\text{Pixel Distance\_avg}[i][j] = \frac{\sum_{(x_k, y_k) \in i} ODT(x_k, y_k)}{\sum_{(x_k, y_k) \in i} 1}$$

III.1.6.2 Pixel Distance Edge Table: Distance_edge

The pixel distance_edge table is a N×N table that for any given individual object interaction i×j records the shortest distance between the boundary of mask i to the boundary of mask of j.

Given an object j, we create the ODT image from the boundary of j. Next we overlay the mask of object i onto this ODT image, and take the minimum ODT value along the boundary of i's mask and store it in the Pixel Distance_edge table.

III.2 Feature Table Production

This step integrates the individual objects into object classes and generates multiple C×C feature tables (where C is the number of classes). In most biological applications the number of classes is known a priori whereas the number of individual objects is not. In the SKY example from FIG. 2, there are 20 classes corresponding to the chromosome classes of a mouse. One of the innovations and benefits of this invention is enabling users to integrate data describing an unknown number of individual object interactions into a more easy to use framework where those individual interactions become part of the statistic describing an biological class interaction; which is a more meaningful unit of analysis.

This invention allows users to specify object integration rules through the GUI. The specification could also be performed automatically. These rules involve four steps; selecting the input table from the relational CM tables, selecting the feature rule, selecting the data treatment, and selecting the class member integration rule. It can be repeated multiple times to create multiple feature tables.

III.2.1 Select the Input Table

The features of interest can only be generated using the core measurements from the relational CM tables (not the conditional CM tables). A user selects from the object distance table, pixel distance_avg table, pixel distance_edge table, radial difference table or Δboundary distance table.

III.2.2 Select the Feature Rule

Every element in the input table is subject to a user defined feature rule. The rule acts as a filter that passes data only from object relations that past the rule or test. The output is a filtered relationship table. If the value in the element passes the rule, either the value or a '1' will be passed to the filtered relationship table (depending on the user selected data treatment, see III.2.3 below). If the value in the table element fails the rule, some value (such as −1, or 0) will be passed to the filtered relationship table indicating that the relation failed the rule.

Rules include element based rules and row based rules. Element based rules include conditional CM table rules and relational CM table rules.

III.2.2.1 Element (E) Rules

Element rules are evaluated on each table element individually, and are measured for the interpretation of each individual element. In one embodiment, the element (E) rules include conditional CM table rules and relational CM table rules.

III.2.2.1.1 Conditional CM Table Rules

Conditional CM table based rules condition the input relational CM table by using the one-dimensional conditional tables, Boundary Distance (BD) and Radial Distance (RD), to filter out the horizontal and vertical rows corresponding to the individual objects that fail the rule. In one embodiment of the invention, these rules include:

a) Boundary Distance (BD)>α%
  i) (α,β is user selected percentage of the max BD in the reference structure object mask IDT)
d) BD<α%
e) α%<BD<β%
f) BD=α%
g) Radial Distance (RD)>απ radians
  i) Here α is a user selected number between 0.00 and 2.00
h) RD<απ
i) βπ<RD<απ
j) RD=απ

III.2.2.1.2 Relational CM Table Rules

Relational CM table based rules filter the input relational CM table using the element values themselves to create the filtered relationship table.

a) Element value (E)>α
  i) α,β is user selected value, E is the value of the element in the input table for any given object interaction i,j
b) E<α
c) β<E<α
d) E=α

III.2.2.2 Row Rules

Row rules are evaluated on each element, but are measured for the interpretation of the row a) RowRank>α
  i) α,β is a user selected value between 0 and N
  ii) Row elements are ranked by element value from smallest to largest (N max)
  iii) Row rank is same for equivalent values (more than one element could have the same rank)
k) RowRank<α
l) RowRank=α
m) β<RowRank<α
n) RowRank=RowMax−α
  i) Here α refers to element rank, not element value
o) RowRank<RowMax−α

III.2.3 Choose the Data Treatment

III.2.3.1 Pass/Fail

If the table element passes the condition, the corresponding element location in the filtered relationship table gets a 1, if it fails it gets a value indicating failure (e.g. 0 or −1).

III.2.3.2 Value

If the table element passes the condition, the element value in the input table is passed to the corresponding element location in the filtered relationship table. If it fails the condition a value indicating failure (e.g. 0 or −1) is passed to the filtered relationship table.

III.2.4 Selecting the Class Member Integration Rule

The class member integration rule is defined by the user and used to create a C×C class based feature table from the N×N filtered relationship table.

It is desirable to create the feature table that for every element i×j, stores a statistic describing the relationship between class i and j in the input image. This invention allows the user to specify a simple class member integration rule to create a statistic describing class i and j's interaction in the input image based on measurements of the individual object interactions of the objects belonging to each class; no matter how many there are.

Figure 1C:
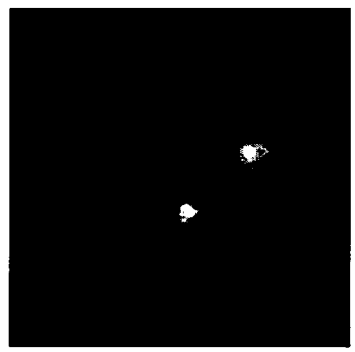
FIG. 1C shows a second labeled gene loci channel of a standard FISH image of the interphase nucleus used to identify the second specific chromosome.
Figure 1B:
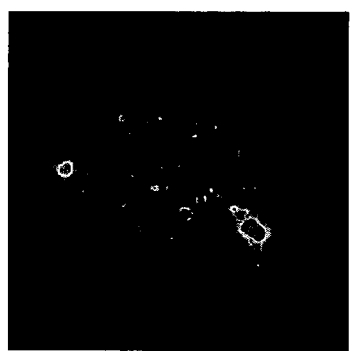
FIG. 1B shows a first labeled gene loci channel of a standard FISH image of the interphase nucleus used to identify the first specific chromosome.
Figure 1A:
FIG. 1A shows the nucleus channel of a standard FISH image of an interphase nucleus.
Figure 1F:
FIG. 1F shows the segmented objects of FIG. 1C.
Figure 1E:
FIG. 1E shows the segmented objects of FIG. 1B.
Figure 1D:
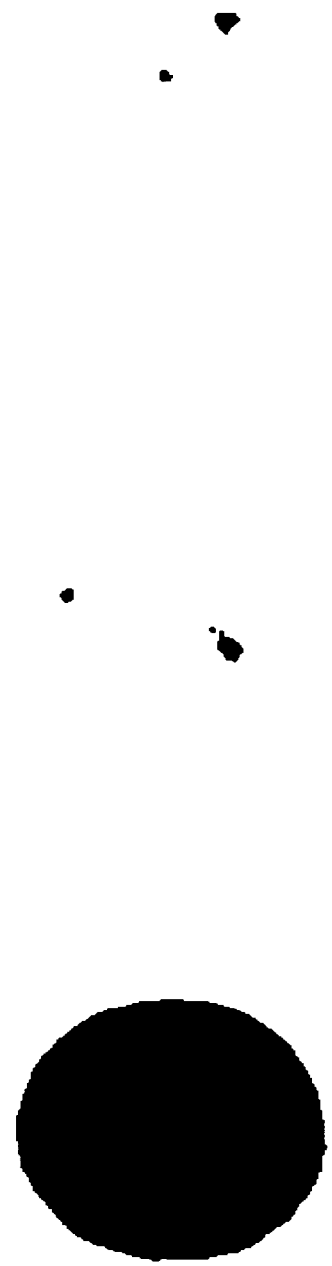
FIG. 1D shows the segmented object of FIG. 1A.
Figure 2B:
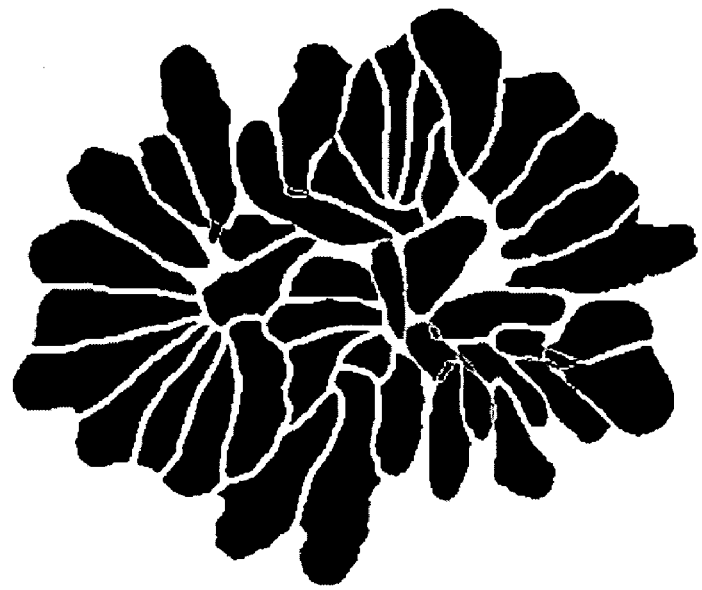
FIG. 2B shows the mask image created in the SKY image creation.
Figure 2A:
FIG. 2A shows the CCD image in the SKY image creation.

For example, in the SKY image example of FIG. 2, where for a given class interaction i×j, each class i, j has two individual objects A,B, the class member integration rule provides a function for mapping 4 elements in the N×N filtered relationship table to one element in the C×C feature table:

FT[i][j]=f(CMF[iA][jA],CMF[iA][jB],CMF[iB][jA], CMF[iB][jB])

Where FT=feature table

CMF=core measurement feature from the filtered relationship table

Integration rule functions include:

(1) Min
(2) Rank 2
(3) Rank 3
(4) Sum
(5) Avg
(6) +,−,*,/

III.3 PatternMap Creation

Assuming multiple feature tables were created, this step allows the user or automatic module to define the method for combining the feature tables together into a single pattern map; the tables are combined cell-to-cell. The possible ways to combine the tables include simple arithmetic, logical operations, min, max, weighted sum, etc. It is also possible to perform scalar operations on the CP tables. Scalar operations include plus, minus, multiple, integer divide, floating point divide and mod. Thus, the inputs are the feature tables, scalar values and operations specification, and the output is a single image pattern map (PM). This step can also be repeated to generate multiple pattern maps.

III.4 PatternMap Integration and Update

In this step the user defines rules for integrating the single image PMs into a PM for the entire data set (called image set PM). There are multiple 'types' of PatternMaps that are distinguished by the feature rules that create the elements' statistic. For example, one single image PM could be a 3 Nearest Neighbor accumulation PM (an accumulation is a weighted integration of multiple pass/fail feature tables), and another could be a 'Distalness' pass/fail PM.

PM update rules are able to integrate both the same and different types of PMs. Therefore, the PM update rule takes in an arbitrary number of PMs and scalar values and combines them into a single image set PM. As such, it is identical to the singe image PM creation rule of III.3 above. The difference here is that an additional step is added to define how the merged PM is updated into the PM for the image set.

This step can also be repeated to generate multiple image set PatternMaps.

Figure 12B:
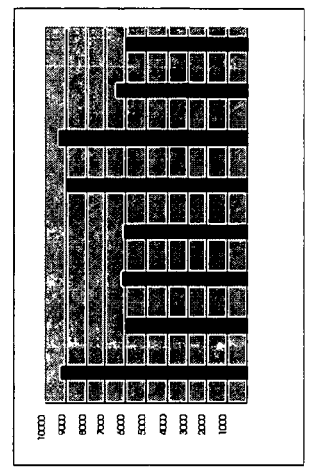
FIG. 12B shows a plot of the data corresponding to the horizontal region of the PatternMap elements in FIG. 12A.
Figure 12C:
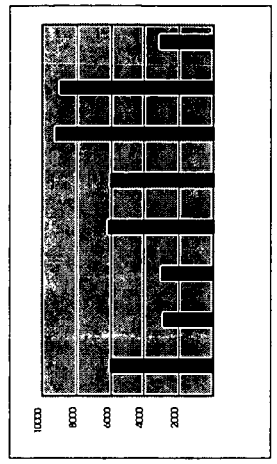
FIG. 12C shows a plot of the data corresponding to the diagonal region of the PatternMap elements in FIG. 12A.
Figure 12D:
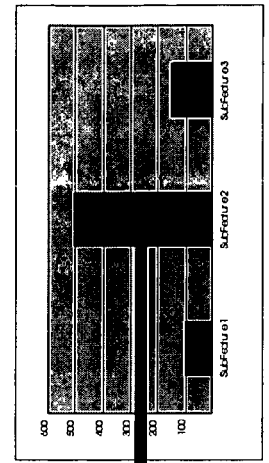
FIG. 12D shows sub-feature histograms for a given element of FIG. 12A.
Figure 12A:
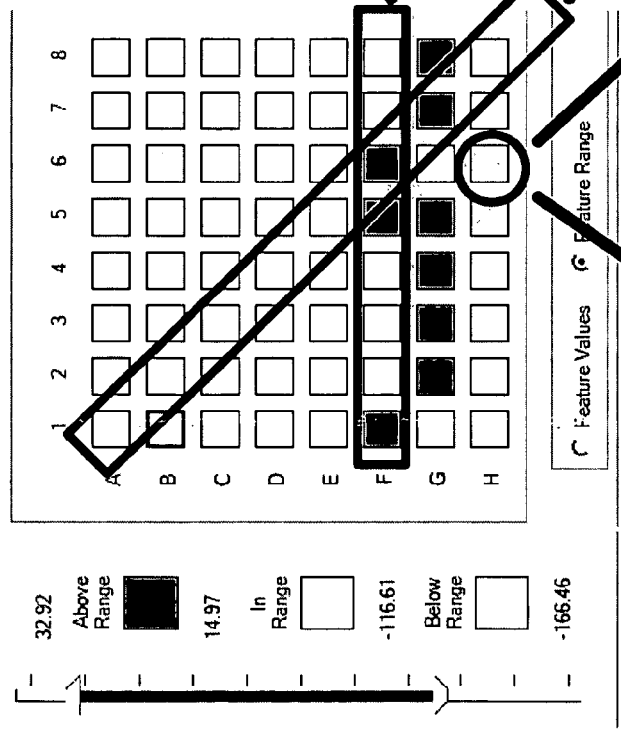
FIG. 12A shows a PatternMap visualization example.
Figure 12E:
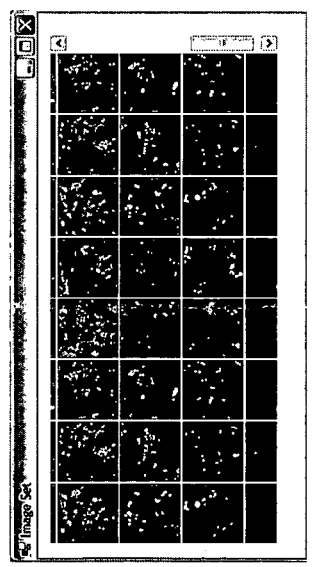
FIG. 12E shows image montage for a given element or element sub-features of FIG. 12A.

In one embodiment of the invention, the user or automatic module selects rules from the following list:

i) PM integration rule (algebraic expressions) for single image PMs
  (1) +, −, *, /(integer divide), ÷(floating point divide), % (mod)
  (2) AND, OR, XOR, min, max
  (3) A potential expression could look like: PM3=PM1−PM2
ii) PM update rule for accumulating integrated PMs into the data set PM
  (1) Min
  (2) Max
  (3) Sum
  (4) Average IV. Relational Pattern Analysis IV.1 PatternMap Viewing The PM consists of a data structure, processing operations, and an easy to use interface designed for the purpose of visualizing C×C object class relationships across an image set. As shown in FIG. 12A, a PM is a C×C matrix where each axis contains the complete class set 1-C. At each matrix intersection or element, the pattern relationship of a given element i×j can be reviewed, including class membership relations at element i×i. Each element of the PM contains a score (summary statistic) directly related to the likelihood of the presence of a user-defined pattern derived from the accumulation of all the images for the cell type. As shown in FIG. 12A, map elements can be shaded or color coded to bring attention to strong scores. The shading or color coding can be manually adjusted with the threshold bar on the left side of the PM (FIG. 12A). Each row of the PM is essentially a distribution of a class' relations to the C other classes (including its own class members). Bar charts of this distribution can be displayed for any row as shown in FIG. 12B. Class member statistics (shown here as the diagonal of the pattern map in FIG. 12C) can also be viewed as bar charts. As shown in FIG. 12D and FIG. 12E, images and sub-feature data can be explored for a given element. The sub-feature data corresponds to the input feature tables. FIG. 12D shows the histogram of the input data for a given PM element broken down by sub-feature; in this example there are three sub-features. Images for an entire element, or only a specified element sub-feature can be presented in a montage for user review (FIG. 12E). The PM can be incrementally updated. Therefore, data from new images could be easily added into an existing PM.

IV.2 PatternMap Operations

PM operations allow transformation and information extraction of a PM. For example, an entropy measurement and other distribution statistics to help detect the unevenness of the distribution (that is, significant patterns) can be performed by PM operations. Users can benefit from many views of the data either by summary statistics or data visualization.

PM operations are used primarily to compare across PMs. Inter-map logic and arithmetic operations can be performed and a result PM can be viewed. For example, one PM corresponding to a cell line could be subtracted from another PM of a differing cell line, the difference PM will show the relational patterns that differ between cell lines.

All of the charting of a single image set PM can be done to compare the same statistics for multiple image set PMs. For example, a row distribution bar chart can be shown with multiple bars per class, where each bar corresponds to a different image set PM.

Those skilled in the art should recognize that many matrix operations and statistics could be used for PM operations.

V. Recipes

The recipes support automation of the above steps and cover everything from image loading to PM operations. Recipes can be used to automate the processing of image samples into an image set PM via PM update rules, or even to process images and store results to a database or file without ever reviewing the intermediate processes.

V.1 PatternMap Recipe

The PM recipe contains an image loading recipe, a feature table production recipe, a PM creation recipe, PM update recipe, a PM operations recipe, and an output recipe.

In one embodiment of the invention, the user begins by selecting 'create recipe' from Manage>CreateRecipe, and chooses PatternMap. Next the user gives a name to the PM.

This brings up the Design Recipe window, which is an icon based interface for programming recipes. The Design Recipe window is specific to this PM recipe being created. The user can choose to work in the Design Recipe window, or select interactive mode that operates in the normal environment.

The user does not have to have a complete sequence of recipe steps. For instance, given 50 input images the user could automate the creation of the image set PM without automating PM operations or data output. The user could automate the production 50*N chromosome pair tables, which is allowed with a warning.

Once the entire recipe path has been configured and each step saved, the user can choose to save and close or execute the PM recipe.

V.2 Image Loading Recipe

The user drags an image loading recipe from the tray in the design window and double clicks on it. This brings up a dialogue in which the user can specify the file folder or database from which the input images are to be found.

V.3 Feature Table Production Recipe

Next the user drags a feature table production recipe icon from the tray onto the canvas and uses a connector to show that this is the next step after image loading. The user double clicks on the icon and brings up the chromosome integration rule interface, which is the same regardless of whether one is in interactive mode or in the Design Recipe window. The GUI has a 'Set Recipe' button that will assign the selected options to the icon in the Design Window.

If the user is in interactive mode, and accesses this GUI via the normal software environment, when he/she clicks on 'Set Recipe', a feature table production recipe icon will be automatically added to the canvas in the Design Recipe window.

V.4 PatternMap Creation Recipe

Same as in step V.3 above, except that the interface and icon are specific to PM creation.

V.5 PatternMap Update and Integration Recipe

Same as V.3 and V.4 above, except that the interface and icon are specific to PM update and integration.

V.6 PatternMap Operations Recipe

Same as V.3, V.4 and V.5 except that the interface and icon are specific to PM operations recipe.

V.7 Output Recipe

This is accessed in the Design Recipe window, the user can select which data to output, and how to output it. PM result output can of course be done in many formats including text file, Microsoft Excel file, XML and database formats The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A computerized method for the detection and analysis of patterns using computer program comprises the steps of:
   a) Input an image containing object labels;
   b) Perform relational feature development using the input image to create at least one pattern map output wherein the pattern map consists of C×C object class relationships across an image set, each row of the pattern map is a distribution of object classes relations to C other classes including itself;
   c) Perform relational feature analysis using the at least one pattern map to create a relational feature analysis result output;
   d) Perform determination of a genetic anomaly.

2. A computerized method for the detection and analysis of patterns using computer program comprises the steps of:
   a) Input an image containing object labels;
   b) Perform relational feature development using the input image to create at least one pattern map output wherein the pattern map consists of C×C object class relationships across an image set, each row of the pattern map is a distribution of object classes relations to C other classes including itself wherein the relational feature development method further comprises the steps of:
      a) Perform core measurement table development using the input image to create at least one core measurement table output;
      b) Perform feature table production using the at least one core measurement table to create at least one feature table output;
      c) Perform pattern map creation using the at least one feature table to create a pattern map output;
   c) Perform relational feature analysis using the at least one pattern map to create a relational feature analysis result output.

3. The relational feature development method of claim 2 further comprises a pattern map integration and update step to create an updated pattern map.

4. The relational feature development method of claim 2 wherein the core measurement table selects from the set consisting of:
   a) Conditional table,
   b) Relational table.

5. The core measurement table of claim 4 wherein the conditional table includes measurements from the set consisting of:
   a) Boundary distance,
   b) Radial distance.

6. The core measurement table of claim 4 wherein the relational table includes measurements from the set consisting of:
   a) Object distance,
   b) Radial difference,
   c) Δ boundary difference,
   d) Pixel distance.

7. The conditional table measurement of claim 5 wherein the boundary distance measurement further comprises the steps of:
   a) Perform structure object mask production using the input image to create a structure object mask output;
   b) Perform inner distance transform using the structure object mask to create an inner distance transform image output;
   c) Find individual object centroids using the input image to create individual object centroids output;
   d) Find object boundary distance using the individual object centroid and the inner distance transform image to create an object boundary distance output.

8. The relational table measurement of claim 6 wherein the object distance measurement further comprises the steps of:
   a) Perform adaptive zone of influence using the input image to create a ZOI boundary output;
   b) Populate the object distance table using the ZOI boundary output to create an object distance table output.

9. The relational table measurement of claim 6 wherein the pixel distance measurement includes measurements from the set consisting of:
   a) Pixel distance average,
   b) Pixel distance edge.

10. The relational feature development method of claim 2 wherein the feature table production further consists of the following steps:
    a) Select one input relational table;
    b) Select a feature rule;
    c) Choose a data treatment;
    d) Select a class member integration rule.

11. The feature table production of claim 10 wherein the feature rule selects from the set consisting of:
    a) Element based rules,
    b) Row based rules.

12. The feature rule of claim 11 wherein the element based rules selects from the set consisting of:
    a) Conditional CM table rules,
    b) Relational CM table rules.

13. The relational feature development method of claim 3 wherein the pattern map integration and update step selects from the set consisting of:
    a) Pattern map integration rule,
    b) Pattern map update rule.

* * * * *